US011331988B2

(12) United States Patent
van Boxtel et al.

(10) Patent No.: US 11,331,988 B2
(45) Date of Patent: May 17, 2022

(54) ROOF SYSTEM FOR A VEHICLE

(71) Applicant: Inalfa Roof Systems Group B.V., Oostrum (NL)

(72) Inventors: Eduardus Christianus Henricus van Boxtel, Zeeland (NL); Marcel Johan Christiaan Nellen, Merselo (NL); Ruud Geurts, Helden (NL)

(73) Assignee: INALFA ROOF SYSTEMS GROUP B.V, Oostrum (NL)

( * ) Notice: Subject to any disclaimer, the term of this patent is extended or adjusted under 35 U.S.C. 154(b) by 0 days.

(21) Appl. No.: 16/376,755

(22) Filed: Apr. 5, 2019

(65) Prior Publication Data

US 2019/0315208 A1   Oct. 17, 2019

(30) Foreign Application Priority Data

Apr. 12, 2018  (EP) .................................... 18167044

(51) Int. Cl.
*B60J 7/043* (2006.01)
*B60J 7/053* (2006.01)
(Continued)

(52) U.S. Cl.
CPC ............. *B60J 7/0435* (2013.01); *B60J 7/053* (2013.01); *B60J 7/0573* (2013.01); *E05F 11/53* (2013.01);
(Continued)

(58) Field of Classification Search
CPC ......... B60J 7/0435; B60J 7/057; B60J 7/0573
(Continued)

(56) References Cited

U.S. PATENT DOCUMENTS 4,650,243 A  3/1987 Hanley et al.
4,679,846 A  7/1987 Lux et al.
(Continued)

FOREIGN PATENT DOCUMENTS

DE  3802380 A1  8/1988
DE  9302762 U1  4/1993
(Continued)

OTHER PUBLICATIONS

European Search Report, dated Jun. 21, 2018 for corresponding European Patent Application No. 18167044.9, filed Apr. 12, 2018.

*Primary Examiner* — Dennis H Pedder
(74) *Attorney, Agent, or Firm* — Steven M. Koehler; Westman, Champlin & Koehler, P.A.

(57) ABSTRACT

A roof system comprises a panel movable between closed and open positions. An operating mechanism comprises front and rear devices. A slide moves the panel both in vertical and horizontal directions via the front and rear devices. At least one of the front and rear devices comprises a lever connected to the slide or the stationary rail through a second pivot pin. A first guide cam is at least partly in engagement with either a stationary guide and/or a curve in the slide. The slide includes a first and second slide part are pivotally connected to each other. One of the slide parts, that is pivotally and slidably connected to said lever, includes a cam engaging a guide curve in the stationary guide rail to force said one slide part to pivot with respect to the other slide part during at least a part of the sliding movement of the slide.

19 Claims, 15 Drawing Sheets

(51) Int. Cl.
  *B60J 7/057* (2006.01)
  *E05F 15/655* (2015.01)
  *E05F 11/53* (2006.01)

(52) U.S. Cl.
  CPC ....... *E05F 15/655* (2015.01); *E05Y 2900/542* (2013.01)

(58) Field of Classification Search
  USPC .................................. 206/216.02–216.5, 223
  See application file for complete search history.

(56) References Cited

U.S. PATENT DOCUMENTS

| | | | |
|---|---|---|---|
| 4,699,421 A | 10/1987 | Schaetzler et al. | |
| 4,741,573 A | 5/1988 | Yokota | |
| 4,923,246 A | 5/1990 | Takahashi et al. | |
| 4,978,165 A | 12/1990 | Schreiter et al. | |
| 4,995,665 A | 2/1991 | Ichinose et al. | |
| 5,026,113 A | 6/1991 | DiCarlo et al. | |
| 5,447,355 A | 9/1995 | Kelm | |
| 5,464,267 A | 11/1995 | Racine et al. | |
| 5,632,523 A | 5/1997 | Kelm | |
| 5,707,102 A | 1/1998 | Takahashi et al. | |
| 6,158,803 A | 12/2000 | Reihl et al. | |
| 6,416,122 B1 | 7/2002 | Schwarz et al. | |
| 6,652,022 B2 | 11/2003 | Pfalzgraf et al. | |
| 6,805,402 B2 | 10/2004 | Pfalzgraf | |
| 7,178,862 B2 | 2/2007 | Oechel | |
| 7,273,248 B2 * | 9/2007 | Boehm | B60J 7/024 296/216.03 |
| 7,828,376 B2 | 11/2010 | Nellen | |
| 7,878,581 B2 | 2/2011 | Faerber et al. | |
| 8,857,903 B2 | 10/2014 | Nellen et al. | |
| 9,776,486 B2 * | 10/2017 | Wingen | B60J 7/05 |
| 2002/0145310 A1 | 10/2002 | Schatzler et al. | |
| 2002/0163227 A1 | 11/2002 | Pfalzgraf et al. | |
| 2005/0231007 A1 | 10/2005 | Oechel | |
| 2006/0012224 A1 * | 1/2006 | Boehm | B60J 7/024 296/223 |
| 2007/0114817 A1 | 5/2007 | Becher et al. | |
| 2007/0228779 A1 * | 10/2007 | Stallfort | B60J 7/0435 296/224 |
| 2009/0179462 A1 | 7/2009 | Nellen | |
| 2010/0164253 A1 | 7/2010 | Faerber et al. | |
| 2015/0306942 A1 | 10/2015 | Heidan et al. | |

FOREIGN PATENT DOCUMENTS

| | | |
|---|---|---|
| DE | 19713348 C1 | 7/1998 |
| DE | 19713347 C1 | 5/1999 |
| DE | 10348545 A1 | 5/2005 |
| DE | 102004018461 A1 | 11/2005 |
| DE | 102005007031 A1 | 8/2006 |
| DE | 202004021827 U1 | 5/2011 |
| EP | 0381066 A2 | 8/1990 |
| EP | 0638452 A1 | 2/1995 |
| EP | 0863817 A1 | 9/1998 |
| EP | 1586475 A2 | 10/2005 |
| EP | 1741588 A1 | 1/2007 |
| EP | 1790515 A1 | 5/2007 |
| EP | 2078630 A1 | 7/2009 |
| FR | 2726512 A1 | 5/1996 |
| KR | 92008091 B1 | 9/1992 |
| NL | 1014023 C2 | 7/2001 |
| WO | 2006086955 A1 | 8/2006 |
| WO | 2007079747 A1 | 7/2007 |

* cited by examiner

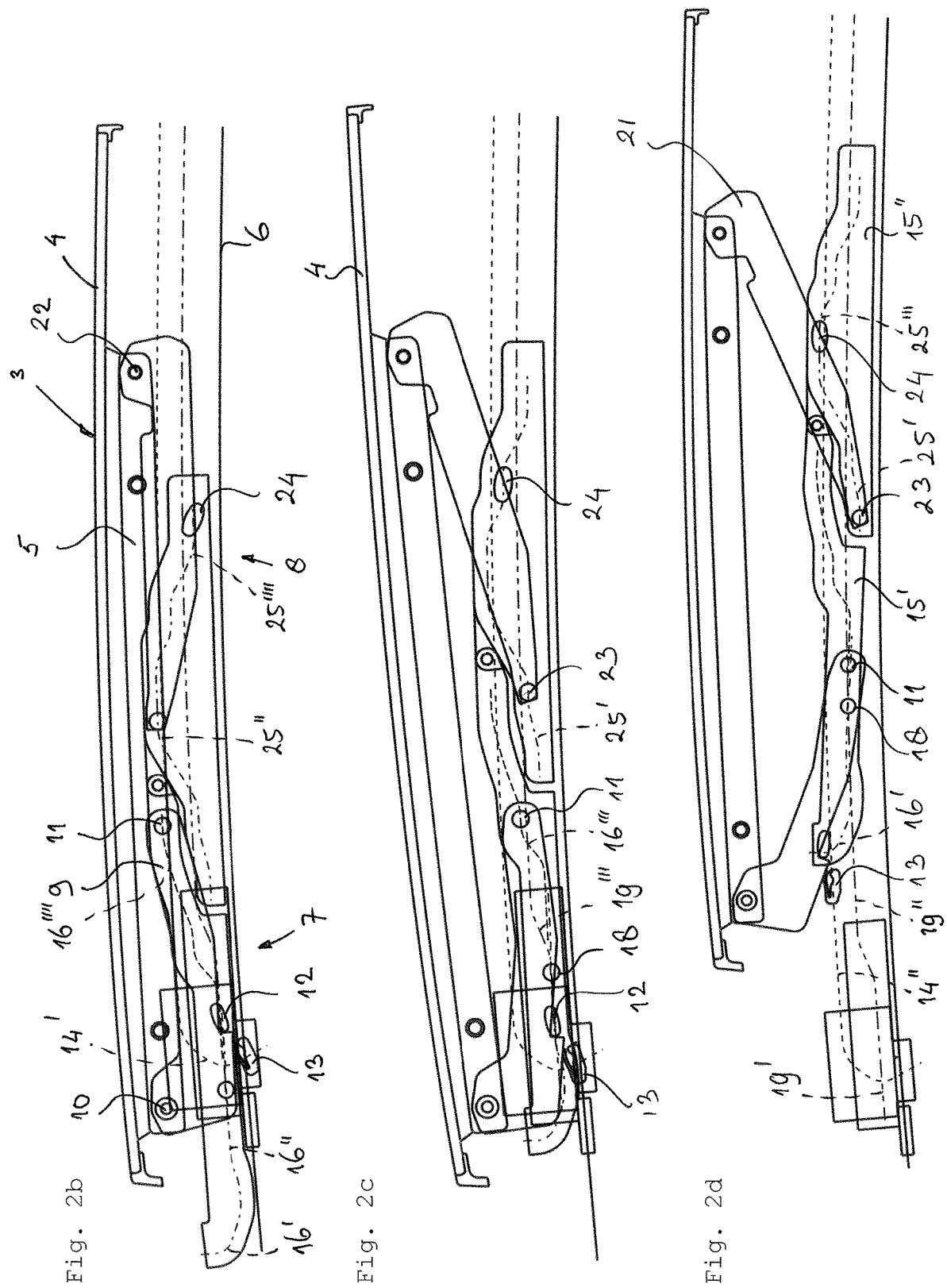

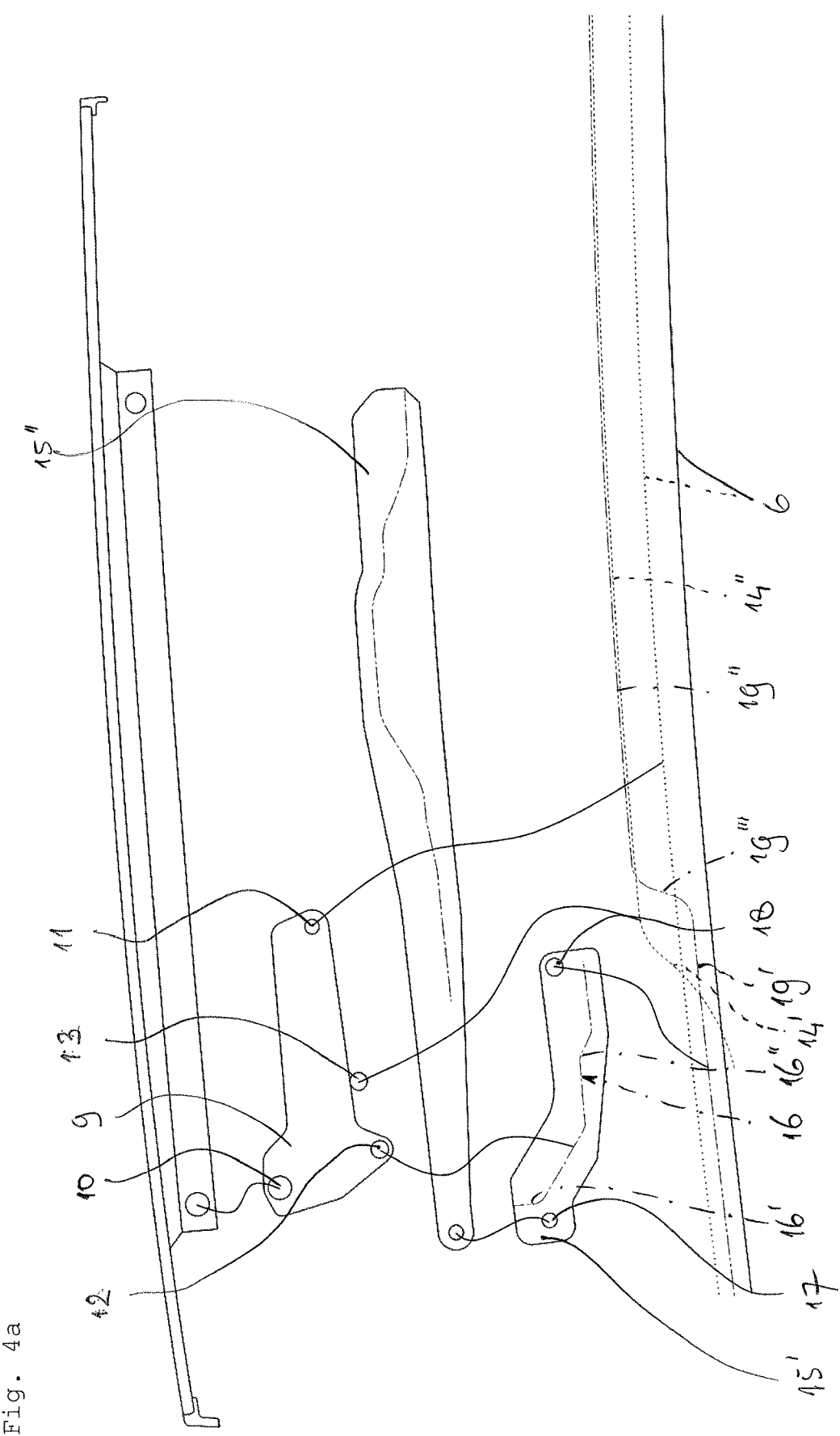

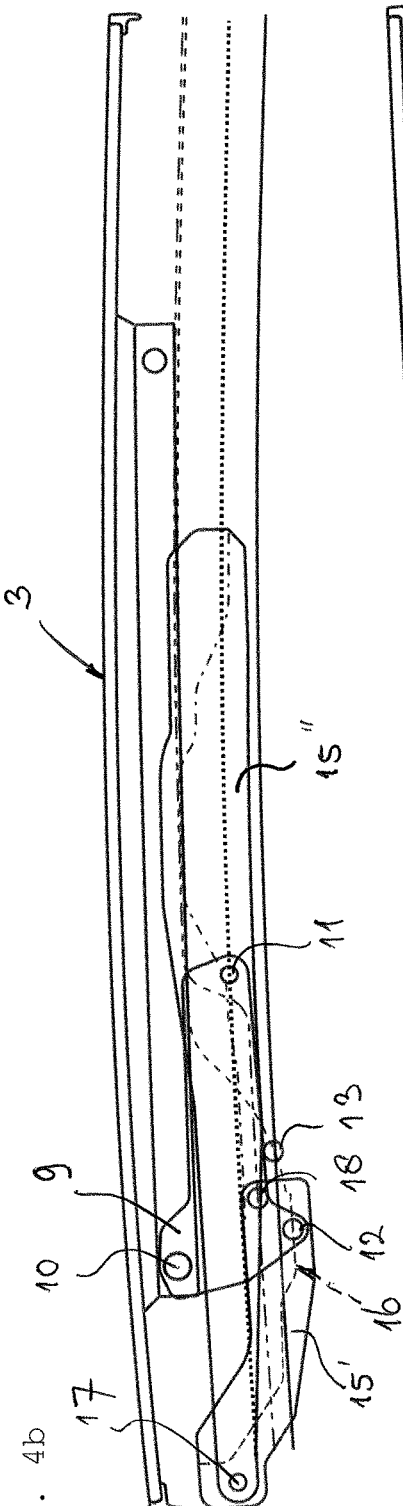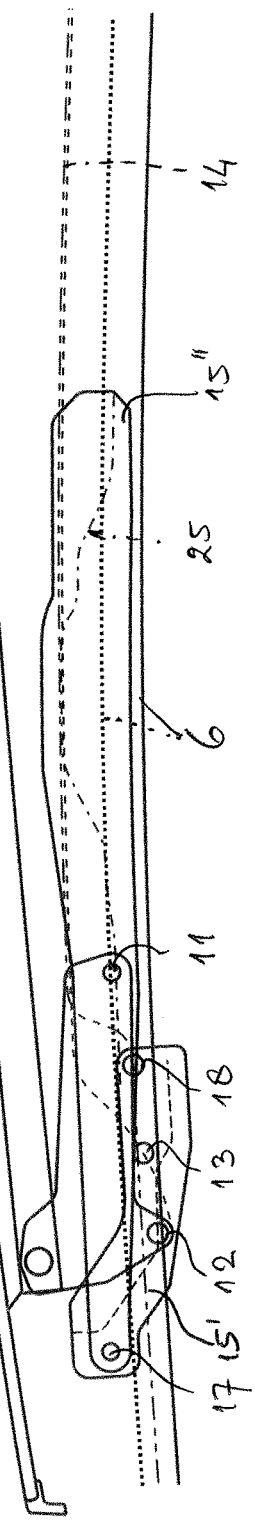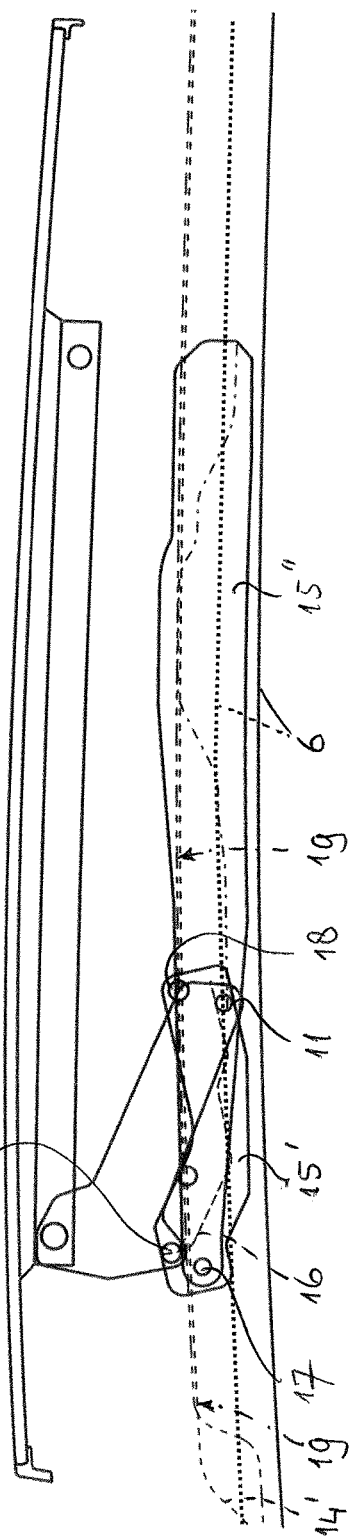

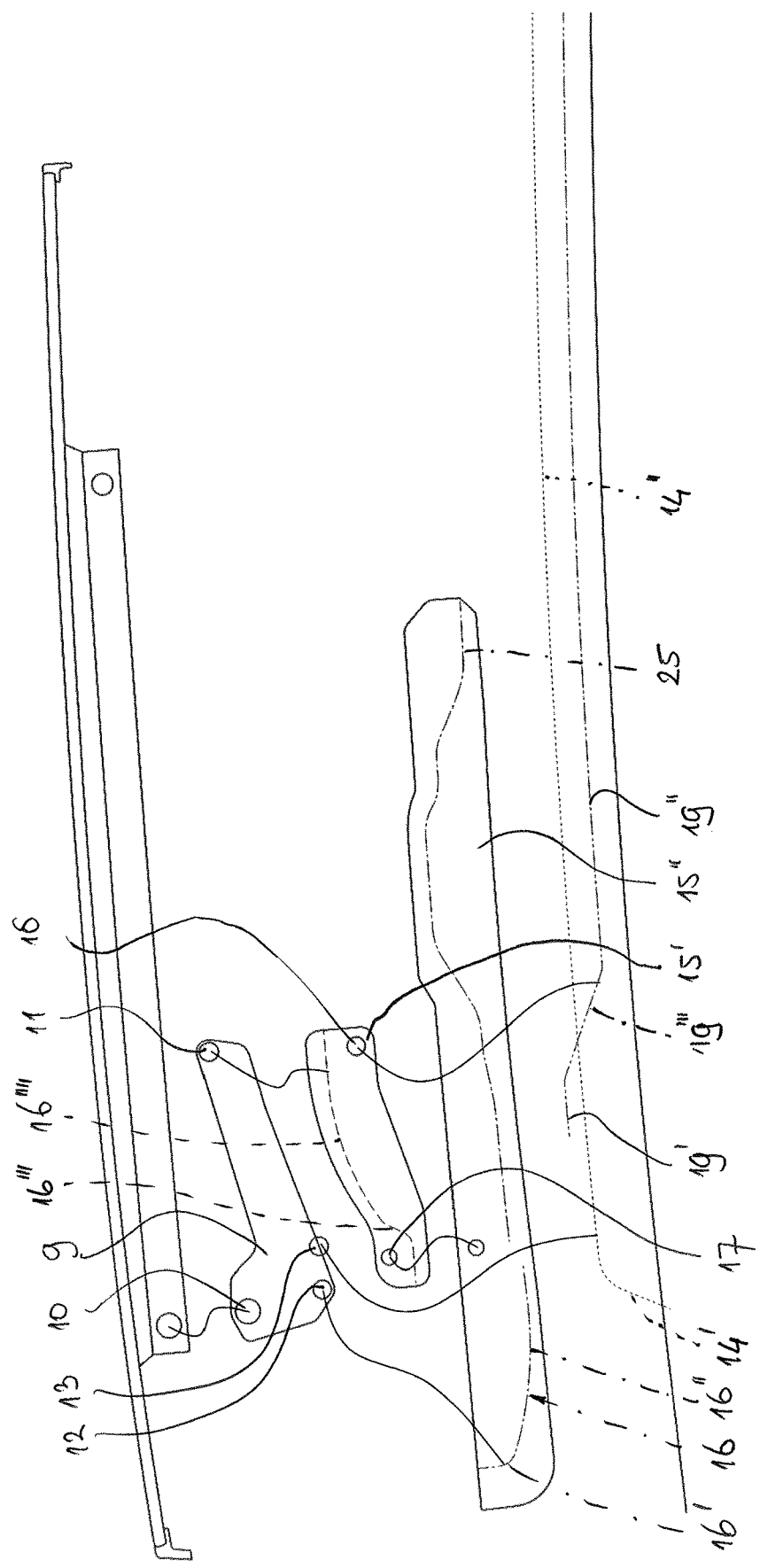

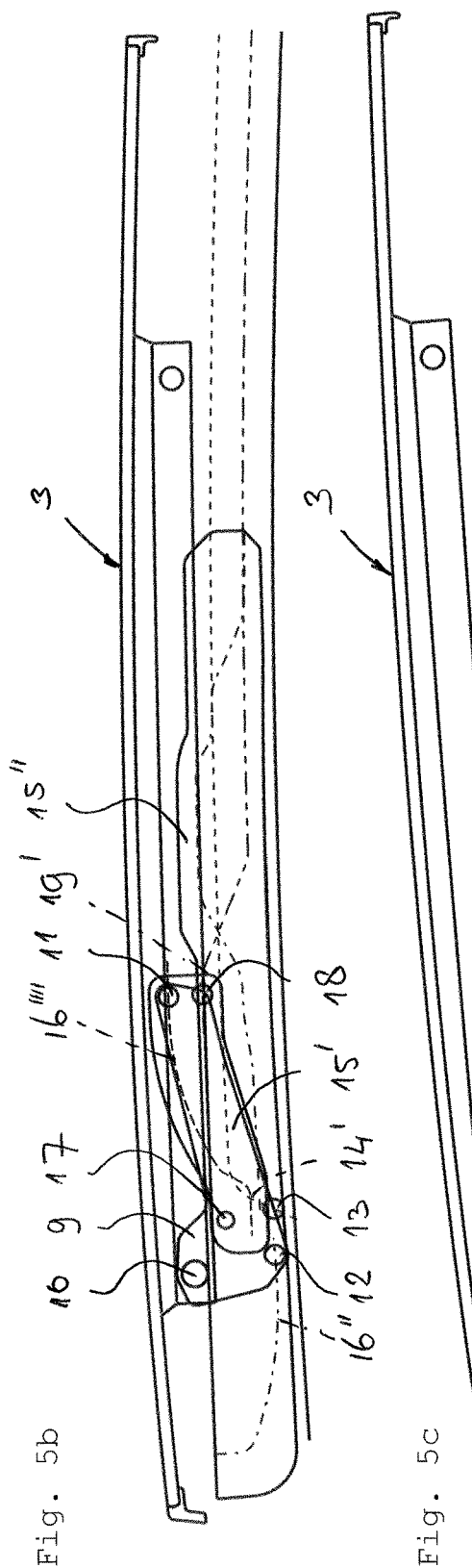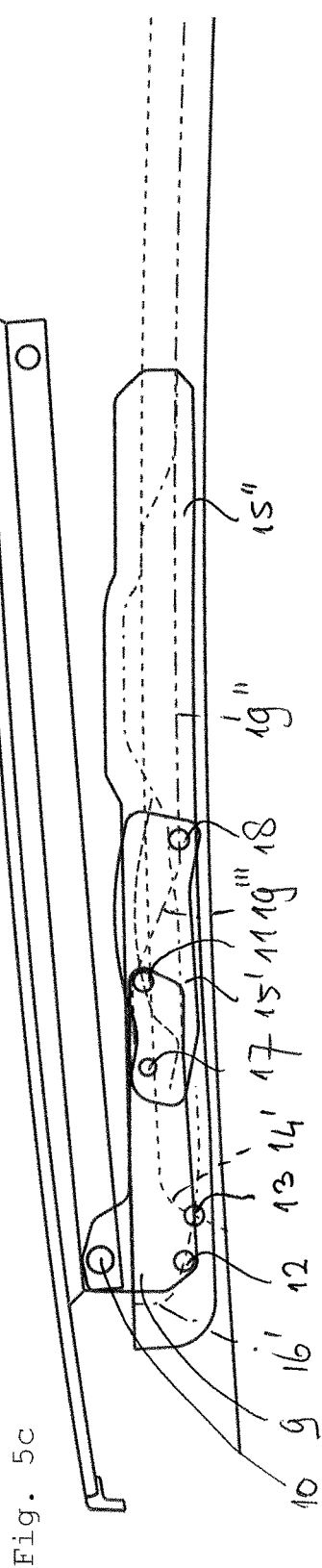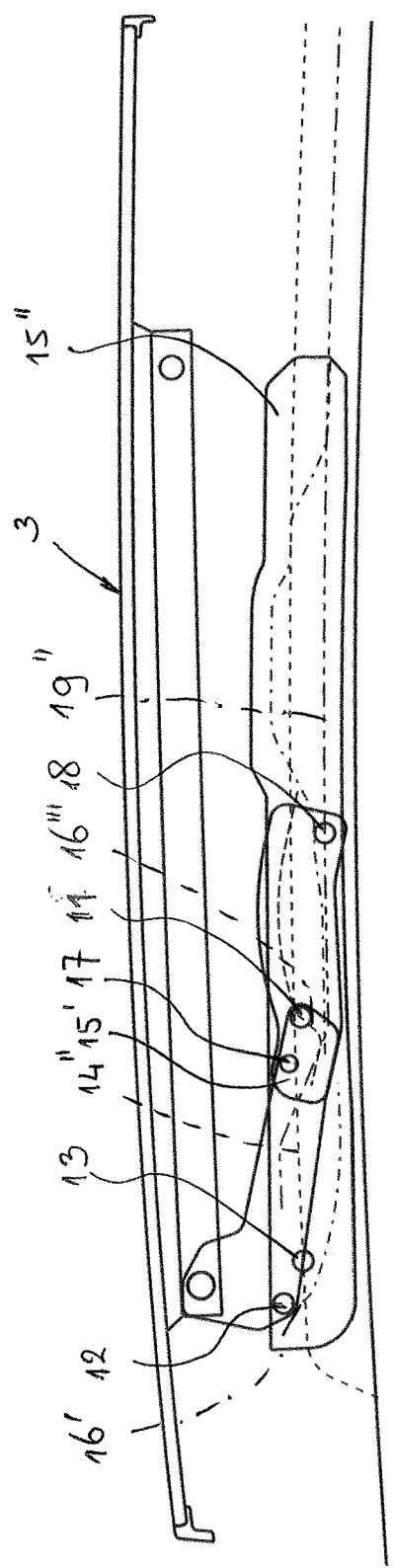

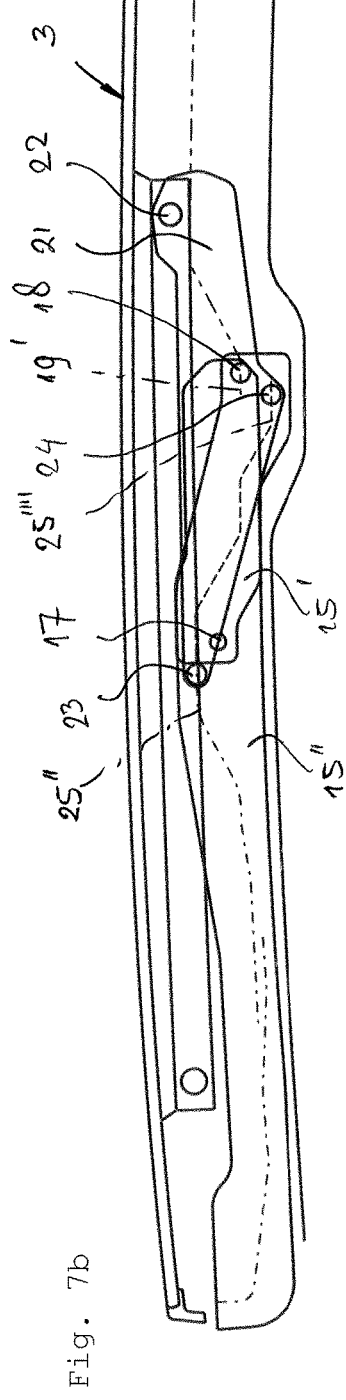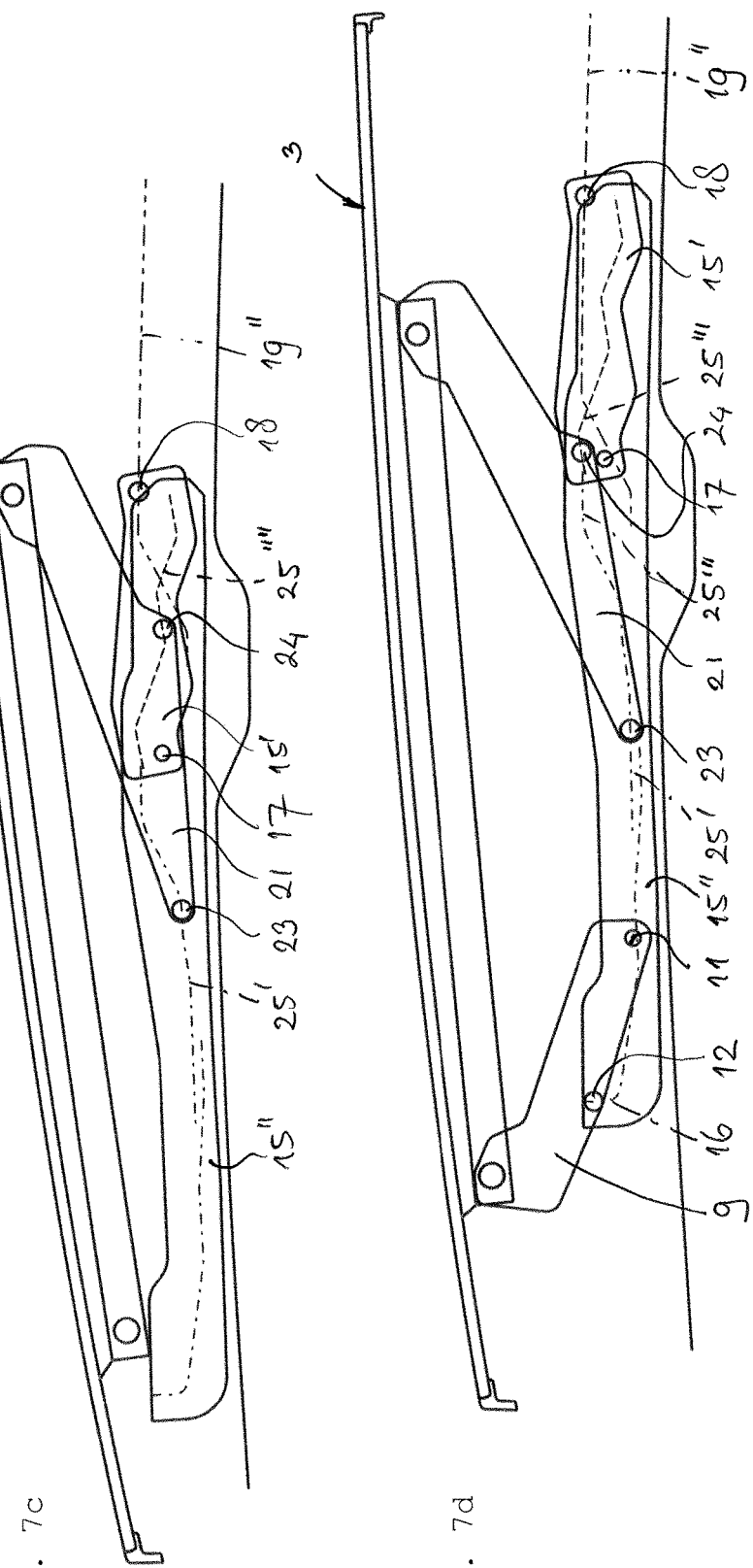

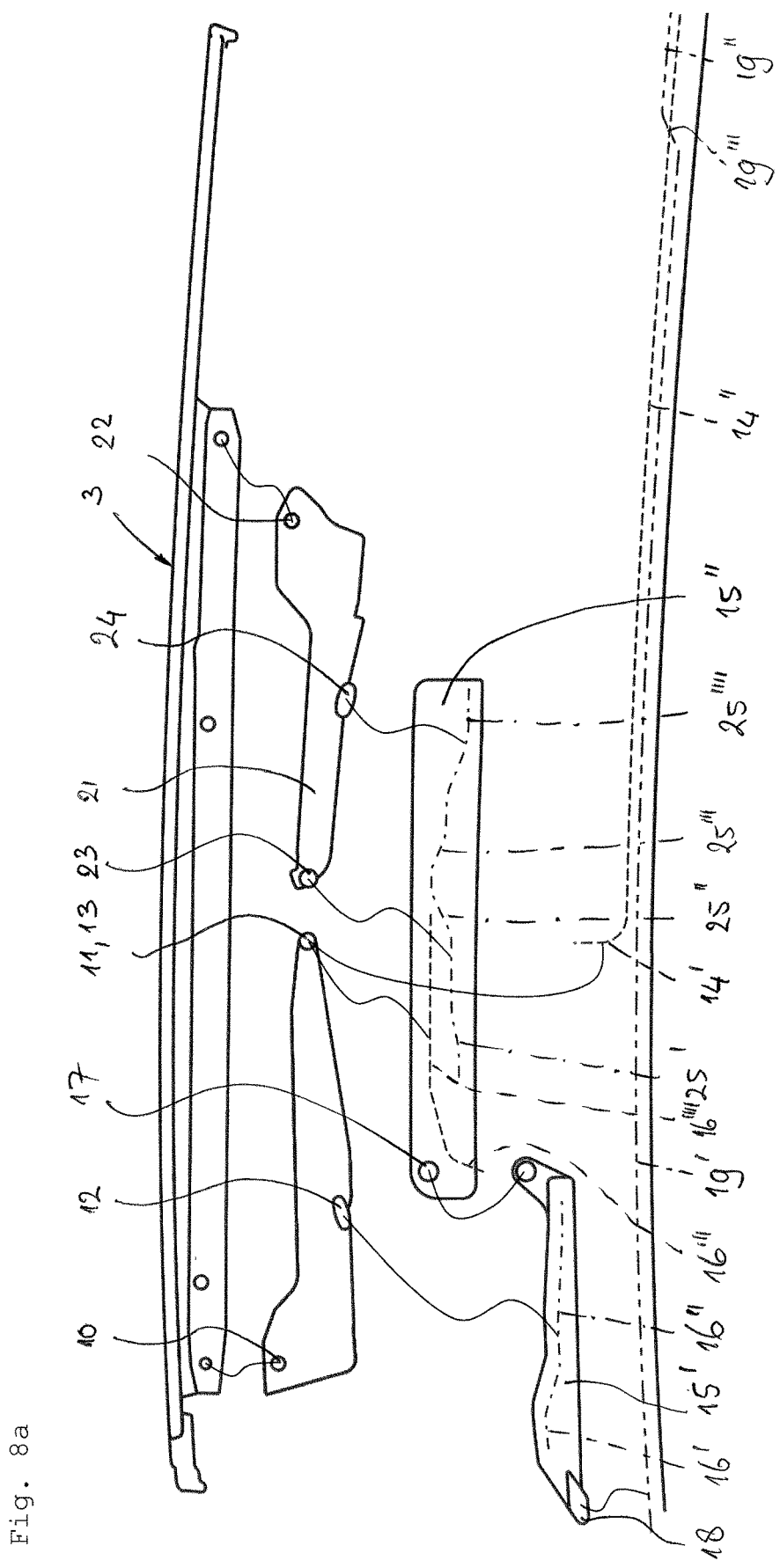

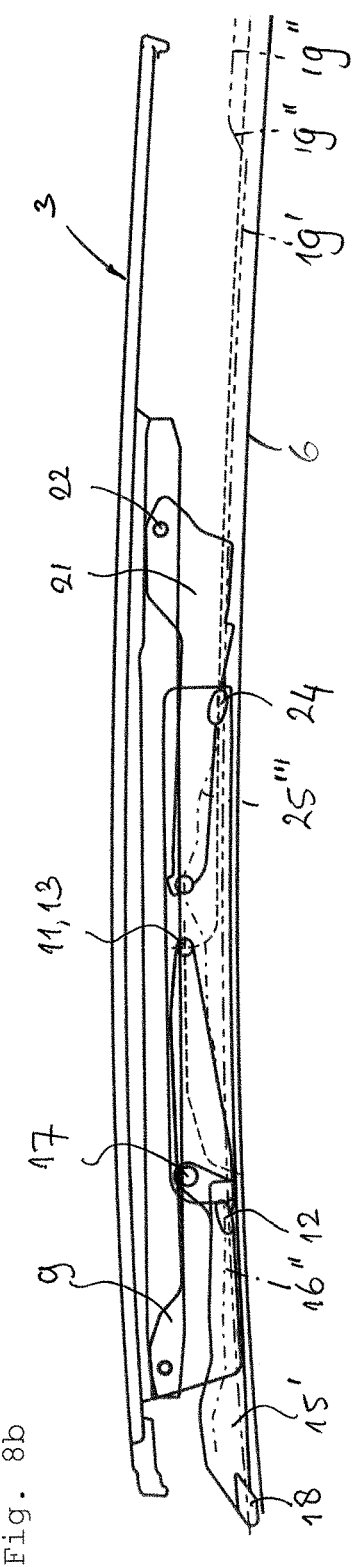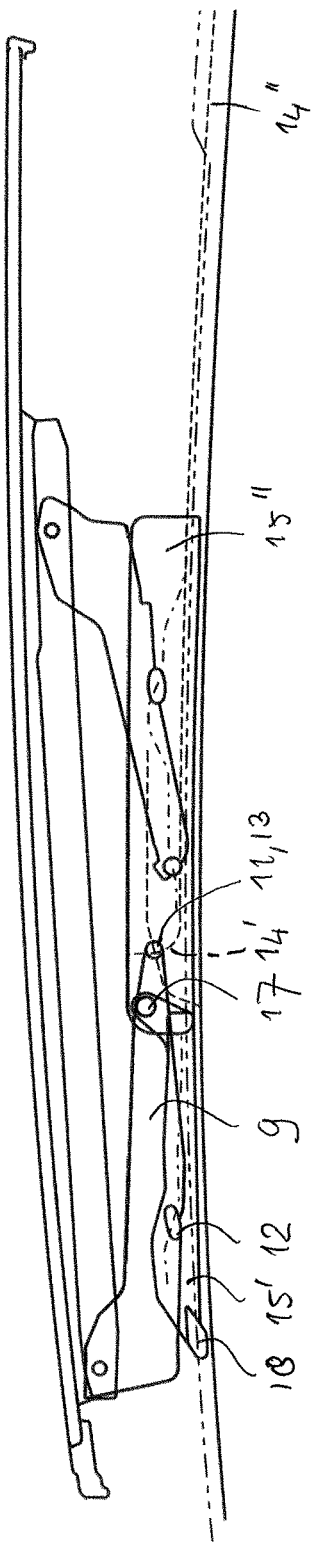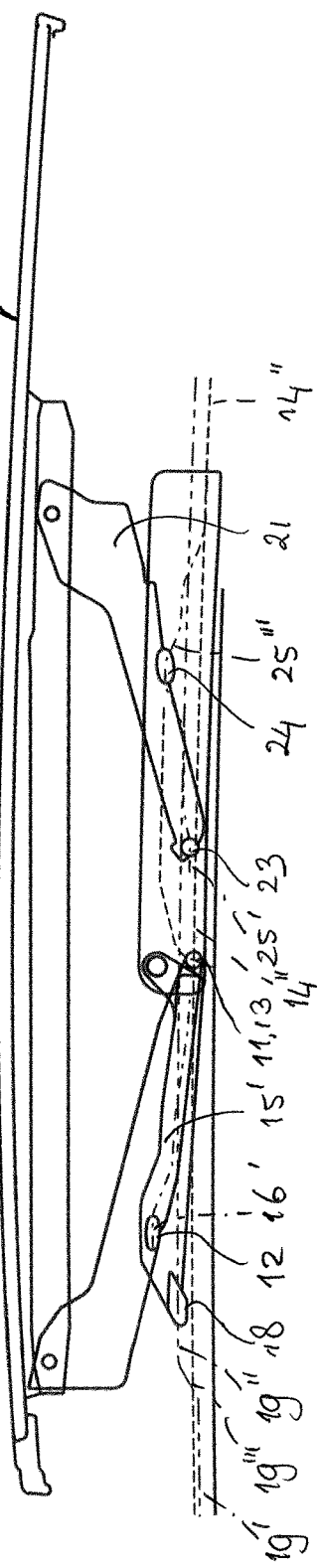

ROOF SYSTEM FOR A VEHICLE

BACKGROUND

The disclosure relates to a roof system for a vehicle according to the preamble of claim 1.

A roof system having an operating mechanism including a front and rear device comprising a lever is known from the prior art, for example from U.S. Pat. No. 7,828,376 B1. In this prior art roof system, the levers of the front and rear devices are pivotally and slidably in engagement with a driving slide. In the closed position of the panel, the package of the operating mechanism should be as small as possible to minimize the loss of headroom in the interior of the vehicle. This may lead to a problem at the front of the mechanism where the first pivot and the panel bracket interfere with the front of the driving slide where the guide curve extends upwardly. The upward extent determines the lifting height of the lever. Lowering this guide curve will decrease the lifting height of the lever which however should be sufficient to lift the front side of the panel above the fixed roof part behind the roof opening. Changing the lever ratio would increase the lifting height, but would result in a less stable support of the panel. Creating more room for the operating mechanism would lead to a loss of headroom.

A roof system according to the preamble, in which the driving slide is split up into first and second driving slide parts pivotally connected to each other, is known from EP 1 586 475 B1. However, this roof system suffers from the same disadvantages.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A roof system for a vehicle having a roof opening in a roof part thereof comprises a closure panel movable between closed and open positions. The closure panel is provided with an operating mechanism allowing the closure panel to pivot and slide. The operating mechanism comprises front and rear devices. A driving slide moves the panel both in vertical and horizontal directions via the front and rear devices. At least one of the front and rear devices comprises a lever which is pivotally and slidably connected to the driving slide or the stationary guide rail through a second pivot pin near the lower end. It is also provided with a first guide cam is at least partly in engagement with either a stationary guide curve and/or a curve in the slide. The driving slide includes a first and second driving slide part and a second driving slide part, which are pivotally connected to each other. One of the driving slide parts, that is pivotally and slidably connected to said lever, includes a guide cam engaging a guide curve in the stationary guide rail to force said one driving slide part to pivot with respect to the other driving slide part during at least a part of the sliding movement of the driving slide.

By providing at least one of the driving slide parts with a forcing mechanism to pivot this driving slide part at a desired position this pivoting movement may be used to either move the driving slide part out of the way to allow passage of another part, increase the lifting height of the lever by pivoting upwards together with the lever and/or to improve the lever ratio by moving the lever into a favourable position in the closed position of the panel as a result of the pivoting movement of the driving slide part. This position of the driving slide part may be extreme, i.e. projecting above or below the stationary guide rail as long as the driving slide part moves back to a position in which the operating mechanism can move in rearward direction below the roof part behind the roof opening.

In one embodiment, the lever is part of the front device and is slidably and pivotally connected to the first driving slide part which is provided with the guide cam that is in engagement with the guide curve in the stationary guide rail, and wherein the at least first guide cam of the lever is at least in engagement with the guide curve in the driving slide.

In a further development, the lever of the front device is provided with a second guide cam which is in engagement with a stationary guide curve.

In one embodiment, the second pivot of the lever is engaging a guide curve in the driving slide.

In another embodiment, the second pivot of the lever of the front device engages a portion of the guide curve in the first driving slide part.

In a further embodiment, the second pivot of the lever of the front device engages a curve portion of the guide curve in the second driving slide part.

The first guide cam of the lever of the front device may also engage a portion of the guide curve in the first driving slide portion.

As an alternative, the first guide cam of the lever of the front device engages a curve portion in the second driving slide portion.

In one embodiment, the first driving slide part is pivotally connected to the second driving slide part near its rear end.

In another embodiment, the first driving slide part is pivotally connected to the second driving slide part near its front end.

The guide cam of the first driving slide part is preferably arranged at a distance from a pivot between the first and second driving slide parts.

In a further embodiment, the guide curve in the stationary guide rail is shaped such that a portion of the first driving slide part spaced from the pivot extends above or below the stationary guide rail in the closed position of the panel and is moved by the guide cam sliding through the guide curve to a position in which the first driving slide part is positioned substantially within the boundaries of the stationary guide rail.

A guide curve in the first driving slide part may extend at least partly forwardly and upwardly, to create additional lifting height for the lever.

In another embodiment, the lever is part of the rear device and is slidably and pivotally connected to the first driving slide part which is provided with the guide cam that is in engagement with the guide curve in the stationary guide rail, and wherein the at least first guide cam of the lever is at least in engagement with a guide curve in the driving slide.

A portion of the curve in the driving slide may be provided in the first driving slide part and either the second pivot or the first guide cam engages this portion of the curve in the first driving slide part.

BRIEF DESCRIPTION OF THE DRAWINGS

Further details and advantages of aspects of the invention will become more clear from the following description of embodiments of the roof system with reference to the drawings.

FIGS. 2b-2d are side views of the operating mechanism of FIG. 2a in 3 different positions.

FIGS. 4a-4d, 5a-5d, 6a-6d, 7a-7d and 8a-8d are views corresponding to those of FIGS. 3a-3d, but showing further embodiments of the operating mechanism in the roof system.

DETAILED DESCRIPTION

Figure 1:
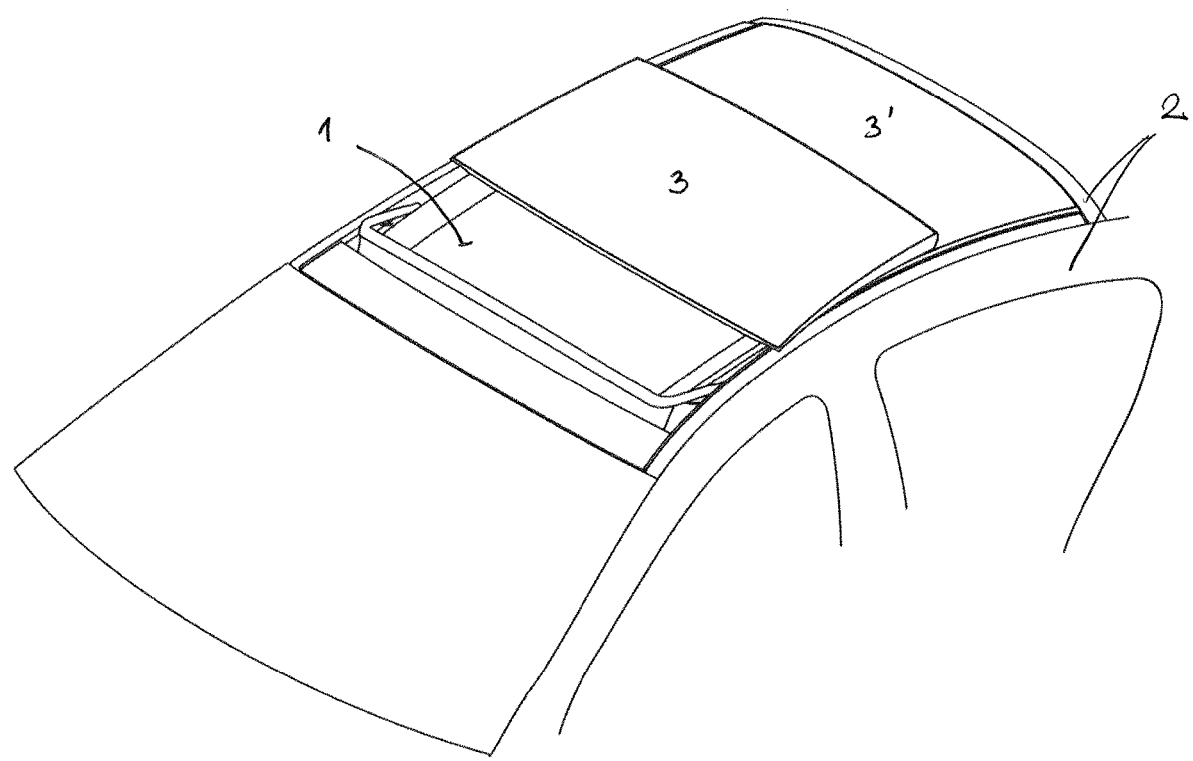
FIG. 1 is a partial perspective views of an automobile provided with a roof system.

FIG. 1 shows part of a vehicle, in particular an automobile, which comprises at least a roof opening 1 defined in a (stationary) roof part 2. A closure, here in the form of a closure panel 3, is movable between a closed position (not shown) in which it closes the roof opening 1, and an open position (shown in FIG. 1) in which it opens the roof opening 1 and in which it is positioned at least partially above the roof part 2, here the fixed roof part adjoining the rear edge of the roof opening 1.

As is known per se such an roof system (which is also known as a top slider roof) could comprise additional elements, such as for example a tiltable wind deflector positioned ahead of the roof opening 1, or further movable or stationary panels, for example in a position behind the panel 3 when it is in its closed position. In fact, in the present embodiment, the roof part behind the roof opening 3 is formed by a roof panel 3' which may be a stationary roof panel or a movable panel.

Figure 2A:
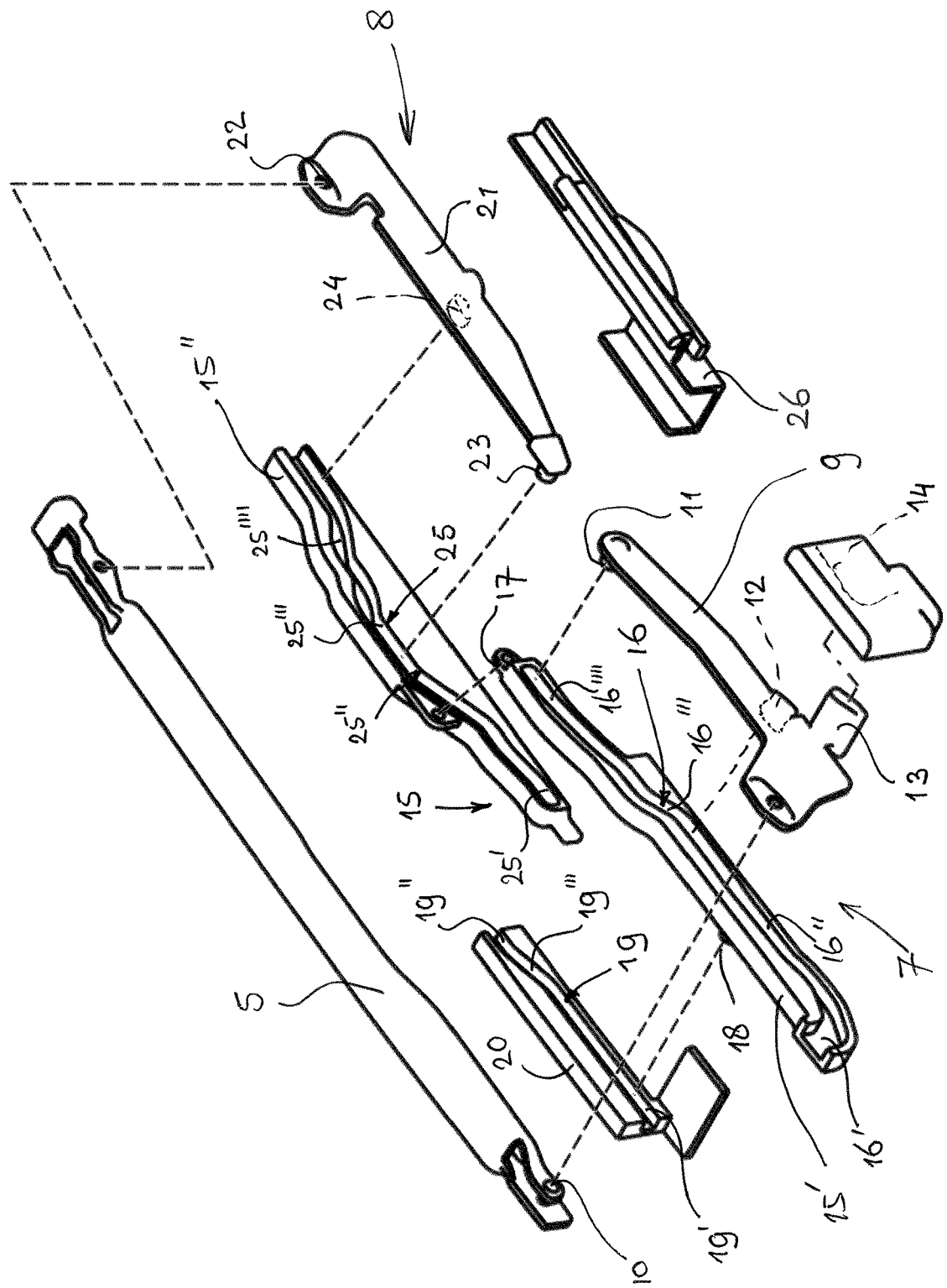
FIG. 2a is an exploded view of the parts of a first embodiment of an operating mechanism on one side of the closure panel of the roof system.
Figure 3A:
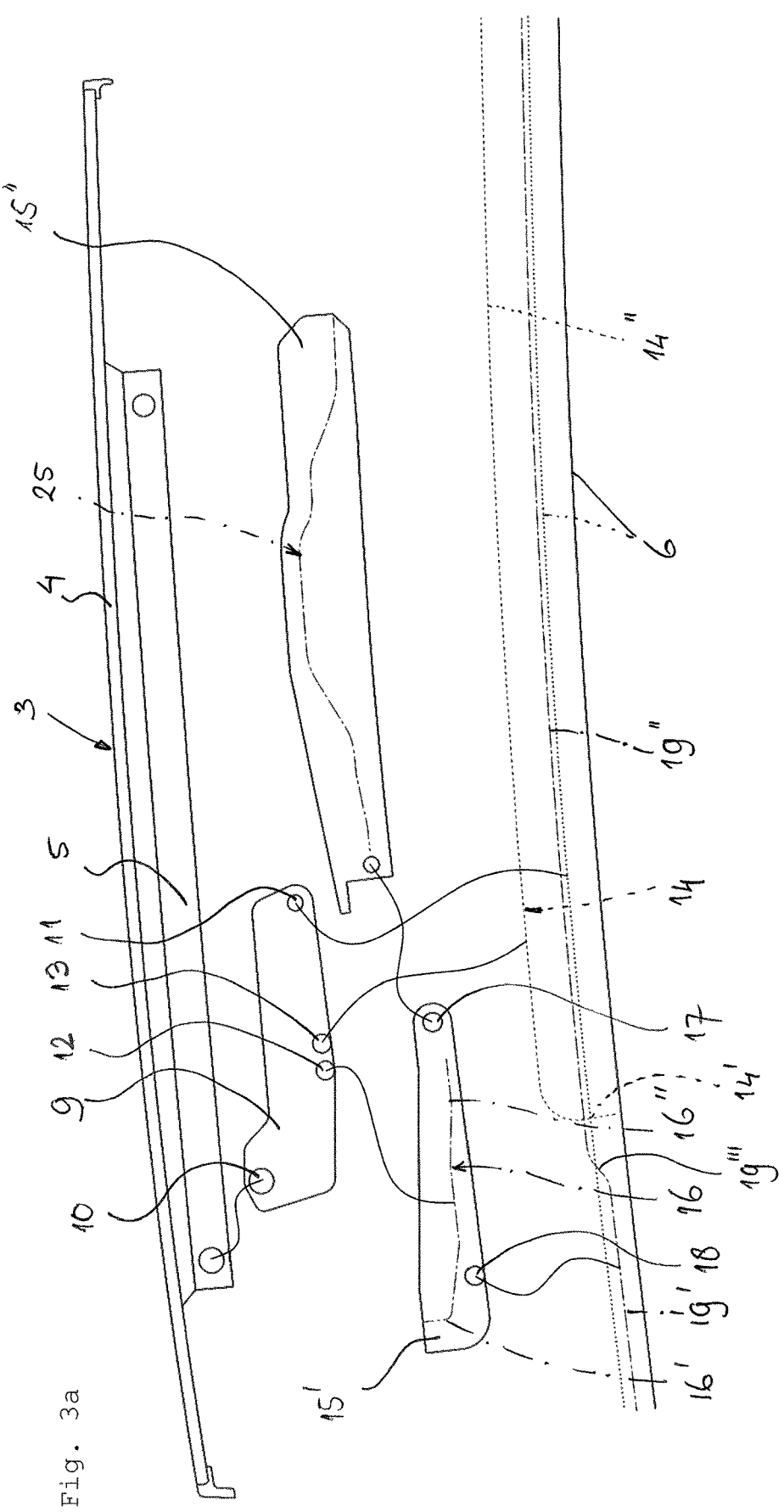
FIG. 3a is an enlarged exploded side view of a further embodiment of the operating mechanism in the roof system.
Figure 3B:
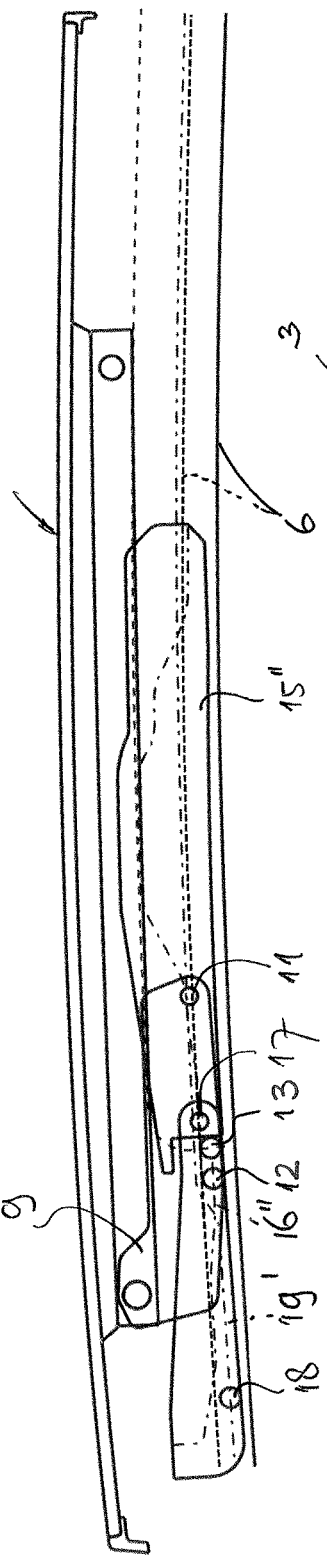
FIGS. 3b-3d are views corresponding to those of FIGS. 2b-2d, but showing the second embodiment of the operating mechanism.
Figure 3C:
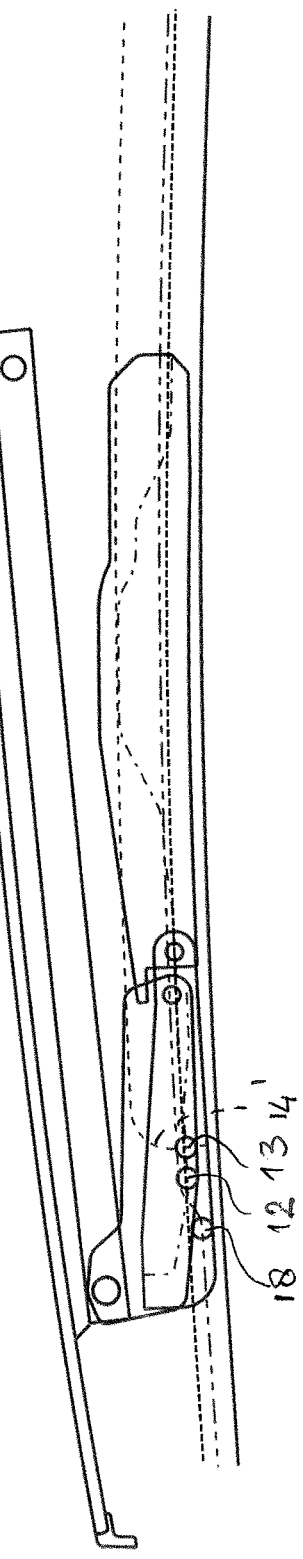
Figure 3D:
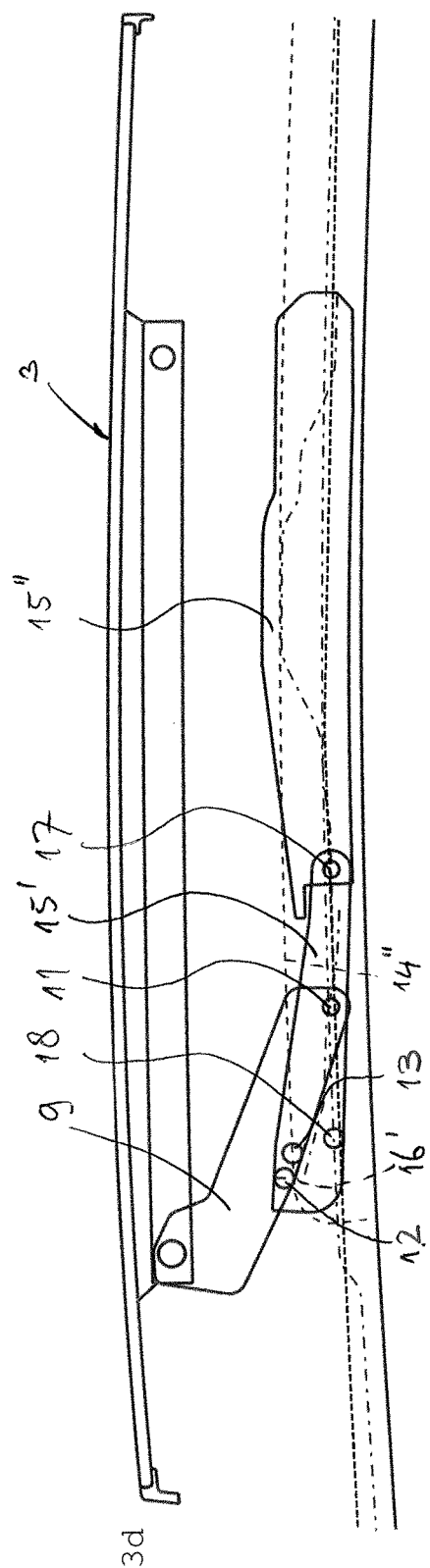

FIG. 2 show the parts of an operating mechanism for closure panel 3 in order to move it between the closed and open positions. One of the longitudinal sides of closure panel 3 is shown, and it is noted that the same parts, albeit in mirror image, are present on the other longitudinal side of panel 3. The panel 3 comprises a glass or plastic transparent or metal non-transparent sheet 4 supported on the longitudinal sides by a panel bracket 5 fixed to sheet 4, for example by encapsulation material and/or any other means, i.e. bolted to a reinforcement frame which is encapsulated to sheet 4 (not shown). At each longitudinal side edge of roof opening 1 there is provided a stationary guide rail 6 having several guide grooves in which parts of the operating mechanism are slidably guided. The guide rails 6 are straight or slightly curved in order to follow the curvature of the vehicle roof.

To move closure panel 3 in longitudinal (along a guide rail 6, only schematically shown in FIGS. 3-8) and vertical (substantially perpendicular to the guide rail 6) directions, the operating mechanism comprises a front device 7 to move the front side of closure panel 1 in vertical direction and a rear device 8 to move the rear side of closure panel 3 in vertical direction, i.e. up and down. Of course, both devices are also used to move closure panel 3 in longitudinal or horizontal direction, i.e. back and forth.

The front device 7 includes a lever 9. In this document, "lever" is used to indicate an element which has a pivoting axis near both operative ends and has a length measured between these pivoting axes which is substantially larger than an effective width and thickness measured perpendicularly thereto. Any guide cam is positioned substantially between these pivoting axes, as seen lengthwise. Such pivoting axis is called pivot or pivot pin, but encompasses all structures that enable at least a pivoting movement of two connected parts.

The lever 9 comprises an upper pivotal connection, pivotally connecting the lever 9 to the panel bracket 5 of panel 3 by means of a first pivot pin 10, a lower pivoting axis, here a second pivot pin 11, and an intermediate guide connection, here in the form of a first guide cam 12. In the vicinity of the first guide cam 12, but on the other side of the lever 9, i.e. on the side opposite to the parts 10, 11 and 12, there is arranged a second guide cam 13. This second guide cam 13 is adapted to be in sliding engagement with a stationary guide curve 14. The stationary guide curve 14 includes a rear portion 14' extending substantially parallel to guide rail 6 (here forming part of it), and a front portion 14" extending substantially perpendicularly to the rear portion 14' and connecting to it through a bend. As second guide cam 13 has a substantially oval shape, the height of stationary guide curve 14 varies along its length depending on orientation of the guide curve 14, but also on the projected orientation of lever 9 and the variation of this orientation of the lever 9 along the length of the guide curve 14.

In FIG. 2 it is shown that the front portion 14" of the stationary guide curve 14 is made in a plastic part which is attached to stationary guide rail 6 which is attached to the vehicle roof 2, either directly or through a frame. The main part of rear portion 14' of stationary guide curve 14 will generally be formed by flanges of stationary guide rail 6 (not shown). The stationary guide curve 14 locks the horizontal movement of panel 3 when it is in its forward position (through portion 14"), and locks the vertical movements of panel 3 when it is in rearward positions (through portion 14').

The second pivot pin 11 and the first guide cam 12 co-operate with a driving slide 15 which will generally be connected directly to a driving mechanism, for example an electric motor or hand crank driving a push and pull cable (not shown) through a cable connector 26. The driving slide 15 is slidably guided in a groove of stationary guide rail 6 and determines the movements of the panel 3. The driving slide 15 includes a front guide curve, here a guide slot, 16 in which second pivot pin 11 and first guide cam 12 slidably engage. Although second pivot pin 11 and first guide cam 12 could have their own guide curve in the driving slide 15, the structure can be simplified by sliding them in a single guide curve, in which the guide paths of pin 11 and cam 12 may slightly overlap, as shown. The front guide curve 16 includes a substantially vertical front locking portion 16', a lower front portion 16", an inclined intermediate portion 16"' and a higher rear portion 16"". The extent of the front guide curve 16 partly determines the vertical movements of the front edge of the panel 3.

The above operating mechanism is very similar to the one disclosed in U.S. Pat. No. 7,828,376 the contents of which are incorporated herein by reference thereto.

However, in the present operating mechanism and as is shown in FIG. 2, driving slide 15 includes a first (here front) driving slide part 15' and a second (here rear) driving slide part 15". First and second driving slide parts 15', 15" are pivotally connected to each other through a pivot 17. This pivot 17 enables first driving slide part 15' to pivot with respect to second driving slide part 15", which is only slidable in stationary guide rail 6. The pivoting movement of first driving slide part 15' is caused by engagement of a guide cam 18 in guide curve 19 of stationary guide rail 6. Guide curve 19 is partly made in a plastic part 20 attached to stationary guide rail 6 and partly in a groove in stationary guide rail 6. Guide curve 19 includes a lower front portion 19' and a higher rear portion 19" connected by an inclined connecting portion 19'''. This inclined portion 19''' causes the rotation or pivoting movement of the first driving slide part 15' and is arranged at a position where such pivoting movement is desired. It is conceivable that a pivoting movement of the first driving slide part 15' is caused at more than one position.

The second or rear device 8 of the operating mechanism includes a lever 21. This lever 21 comprises an upper pivotal connection or first pivot pin 22, a lower pivoting axis or second pivot pin 23, and a guide cam 24. Both levers 9 and 21 extend in opposite directions, that is the front lever 9 extends from its connection to the panel 3 backwardly and downwardly, whereas the rear lever 21 extends forwardly and downwardly from the panel 3. As a result, both levers can be controlled be the same driving slide 15 having a relatively short length, whereas the levers 9 and 21 connect to the panel 3 at a position near the front or rear edge respectively. This close connection to the front and rear edge of the panel 3 makes the support of the panel 3 very stable.

The slidable connection between the rear lever 21 of the rear device 8 and the driving slide 15, in this case the second driving slide part 15", is accomplished by the engagement of the second pivot pin 23 and the guide cam 24 with a rear guide curve 25. Rear guide curve 25 might be considered as two separate guide curves or slots, one for the second pivot pin 23 and one for the guide cam 24 as the paths of movement thereof do not overlap. The guide curve 25 includes a lower front portion 25', a higher front portion 25", a high rear portion 25''' and a lower rear portion 25''''. The second pivot pin 23 slides only in front portions 25' and 25", whereas guide cam 24 moves in rear portions 25''' and 25''''.

The operation of the roof assembly's operating mechanism will be explained mainly with reference to FIGS. 2b-2d.

In FIG. 2b, panel 3 is shown in its closed position in which panel 3 closes opening 1 in roof part 2 (FIG. 1). The panel 3 will be pulled forcedly by the operating mechanism with its seals in engagement with roof part 2, so that no leakage of noise from the environment to the interior of the vehicle will occur. The seals (not shown) may either be fixed to panel 3 or to stationary roof part 2, or even to both. In this closed position both levers 9 and 21 of front and rear devices 7, 8 are in their lowest position. This is accomplished by their engagement with driving slide 15 which is in its front position in guide rail 6. In this front position of driving slide 15, second pivot pin 11 of lever 9 is positioned near the rear ends of higher rear portion 16'''' of front guide curve 16, whereas first guide cam 12 is positioned near the rear end of lower front portion 16" of curve 16. The second guide cam 13 of lever 9 is positioned at the lower end of front portion 14" of stationary guide curve 14. This substantially vertical front portion 14" of stationary guide curve 14 provides a very stable lock against sliding movements of panel 3 of the operating mechanism. The upper wall of front guide curve 16 keeps guide cam 12 down and due to the arrangement of this intermediate guide cam near first pivot pin 10, and due to the position of pivot pin 10 near the front edge of panel 3 there is provided a very stable closed position of panel 3 at least near the front edge.

The first driving slide part 15' is pivoted to its most downward position due to the engagement of its guide cam 18 with lower front portion 19' of stationary guide curve 19. As a result, the front end of driving slide 15 has a relatively low profile when in its front position enabling driving slide to move below any seal structure or other stationary part at the front of the roof system, while the front of first driving slide part 15' may easily move below panel bracket 5 and first pivot pin 10.

The lever 21 of rear device 8 is in its downward position due to the position of guide cam 24 near the lower rear end of rear portion 25'''' of rear guide curve 25, and the position of second pivot pin 23 in higher front portion 25". Also here, guide cam 24 is positioned relatively close to first pivot pin 22 to panel 3, so that, if guide cam 24 is kept in its lowest position the rear portion of panel 3 can hardly move.

In the position of FIG. 2c driving slide 15 has been moved over a distance rearwardly while panel 3 is kept substantially in its front position due to the engagement of second guide cam 13 with substantially vertical front locking portion 14" of stationary guide curve 14 preventing a sliding movement of panel 3. However, second guide cam 13 has been moved slightly upwardly in this vertical front portion 14" due to the movement of second pivot pin 11 through higher rear portion 15'''' and the movement of first guide cam 12 through lower front portion 16' of front guide curve 16.

The movement of second pivot pin 23 of rear lever 21 from lower rear portion 25'''' to high rear portion 25''', rear lever 21 has been pivoted upwardly so that the rear edge of panel 3 has been moved to a position above roof panel 3' or roof part 2, so that a venting position is created.

FIG. 2d shows a further position of panel 3, in which the front edge of panel 3 has been lifted upwardly and panel 3 has been slid rearwardly over adjacent roof part 2'. The sliding movement of panel 3 has been made possible by moving second guide cam 13 out of locking front portion 14" of stationary guide curve 14. This has been accomplished by the upward tilting movement of lever 9 due to the entry of first guide cam 12 into vertical front locking portion 16' of front guide curve 16 in first driving slide part 15'. The vertical pivoting movement of front lever 9 is enhanced by the upward pivoting movement of first driving slide part 15' caused by the movement of its guide cam 18 through inclined portion 19''' to higher rear portion 19" of stationary guide curve 19. Due to this pivoting movement, the height of front locking portion 16' of front guide curve 16 and therefore height of driving slide 15 may be kept low, leading to a small package of the operating mechanism at the front of the roof system.

In the position of FIG. 2d, levers 9 and 21 and therefore panel 3 are now locked in sliding direction with respect to driving slide 15. The first guide cam 12 is kept in its position in front locking portion 16' due to the engagement of second guide cam 13 with rear portion 14' of stationary guide curve 14 preventing a vertical movement of lever 9. Thus, in the position of FIG. 2d, panel 3 and the operating mechanism move as a unit. The roof panel 3' rearwardly of roof opening 1 is bordered at its longitudinal sides by a slot (not shown), so that driving slide 15 may be slid far rearwardly below roof panel 3', whereas panel 3 may move over this roof panel 3, because rear lever 21 or even also front lever 9 may project through this slot above guide rail 6 in a manner known per se.

FIGS. 3a-3d show a second embodiment of the operating mechanism. The main difference with the first embodiment is that second pivot pin 11 of front lever 9 is not in engagement with front guide curve 16 in front driving slide part 15' but with stationary guide rail 6, for example in a manner as disclosed in U.S. Pat. No. 8,857,903 B1, the contents of which are incorporated herein by reference thereto. As a result, front driving slide part 15' can be kept shorter as front guide curve 16 is shorter, including only portions 16' and 16". The operation and structure of other parts in the operating mechanism are similar to those in the first embodiment.

FIGS. 4a-4d show a third embodiment of the operating mechanism. Again, first driving slide part 15' is pivotally connected to rear driving slide part 15", but now pivot 17 is arranged at the front of first and second driving slide parts 15', 15". When front driving slide part 15' is now pivoted downwardly in the closed position of panel 3, first guide cam 12 is positioned low and therefore the vertical distance between first guide cam 12 and first pivot pin 10 should be larger. This larger distance and a greater vertical extent of guide curve 19 in front driving slide part 15' results in a sufficient upward lifting movement of the front of panel 3 without the front of first driving slide part 15' being moved in upward position. Also the leverage of lever 9 is improved. Due to the upward pivoting movement of the rear end of first driving slide part 15', the height of this first driving slide part 15' becomes smaller and fits within the height of stationary guide rail 6 when guide cam 18 is in higher portion 19" of guide curve 19.

Front portion 14' of stationary guide curve 14 is now less vertical, so that lever 9 will pivot upwardly while moving rearwardly. From the position of FIG. 4c, front driving slide part 15' will pivot upwardly and the movement of lever 9 will be determined by the movement of first guide cam 12 through inclined portion 16" of guide curve 16 in front driving slide part 15', pivoting movement of front driving slide part 15' and movement of second guide cam 13 through inclined portion 14' of stationary guide curve 14. When first driving slide part 15' pivots upwardly, the angle of inclined portion 16" of guide curve 16 becomes smaller and thus the vertical movement of first pivot pin 10 of lever 9 is reduced when first guide cam 12 progresses through inclined portion 14' of guide curve 14. As in the second embodiment, second pivot pin 11 is engaged in stationary guide rail 6.

FIGS. 5a-5d show a fourth embodiment of the operating mechanism. First driving slide part 15' pivots with respect to the second driving slide part with pivot pin 17 at its front end like in the FIG. 4 embodiment, but now second driving slide part 15" is extended in forward direction beyond pivot pin 17 to accommodate front portions 16' and 16" of guide curve 16 engaged by first guide cam 12 of lever 9. Now rear portions 16''' and 16'''' of guide curve 16 are accommodated in first driving slide part 15' and is engaged by second pivot pin 11 like in the first embodiment. Guide curve 19 in stationary guide rail 6 now has a high front portion 19' and a low rear portion 19", allowing rear end of lever 9 to move from a high position in the front position of panel 3 to a low position in portion 19" when panel 3 is in rear positions. Thus, first driving slide part 15' fits within stationary guide rail 6 when panel 3 is moved rearwardly (as shown in FIGS. 5c and 5d), while the high position of second pivot pin 11 at the rear end of lever 9 (as shown in FIG. 5b with panel 3 closed) enables a more favourable lever ratio of lever 9.

Figure 6A:
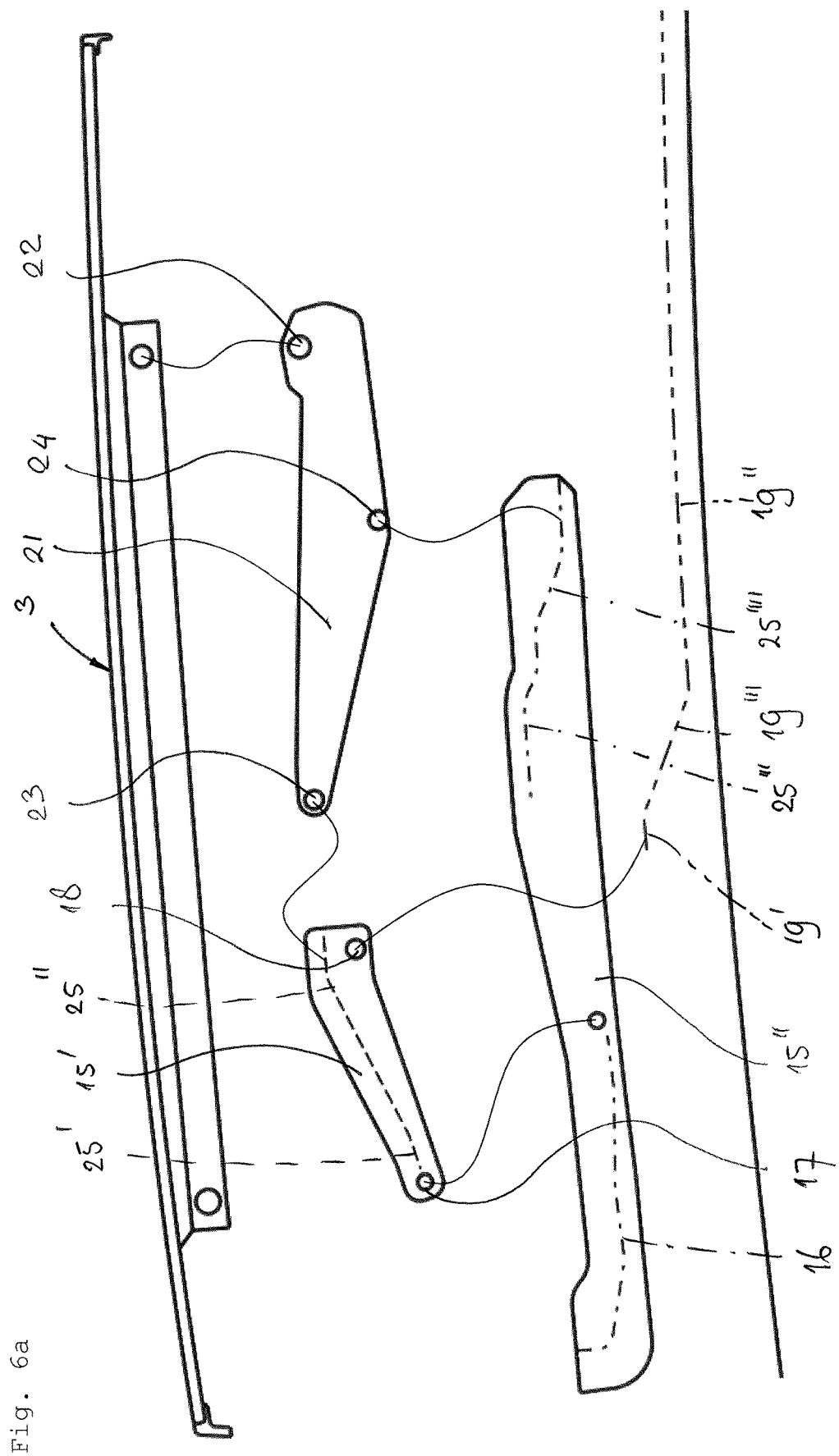
Figure 6B:
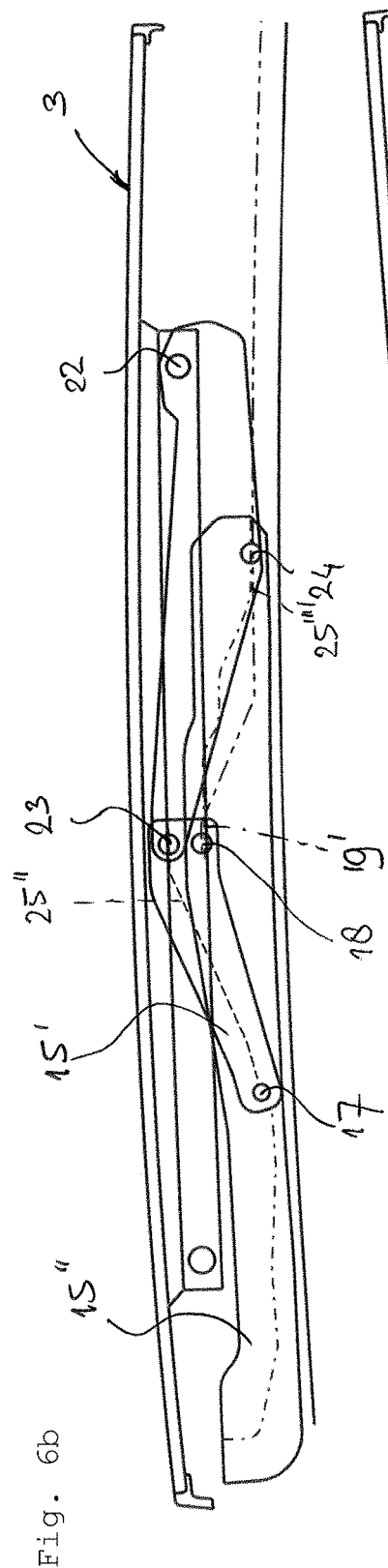
Figure 6C:
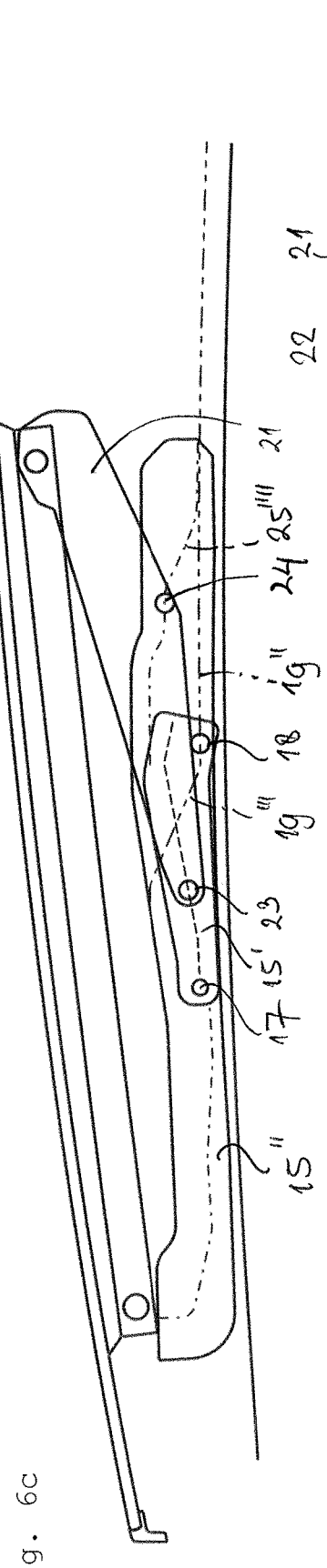
Figure 6D:
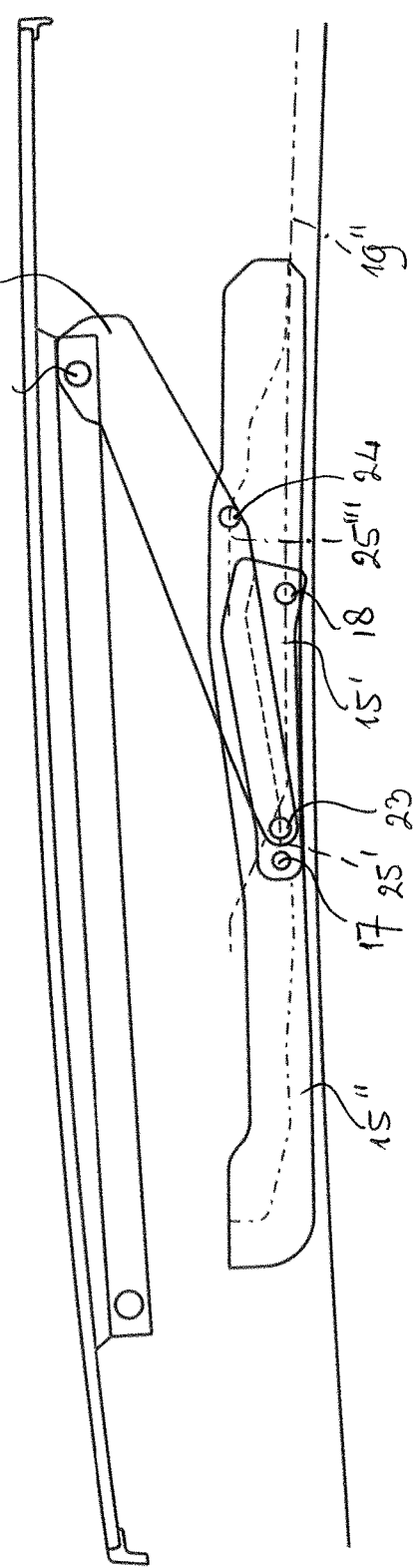
Figure 7A:
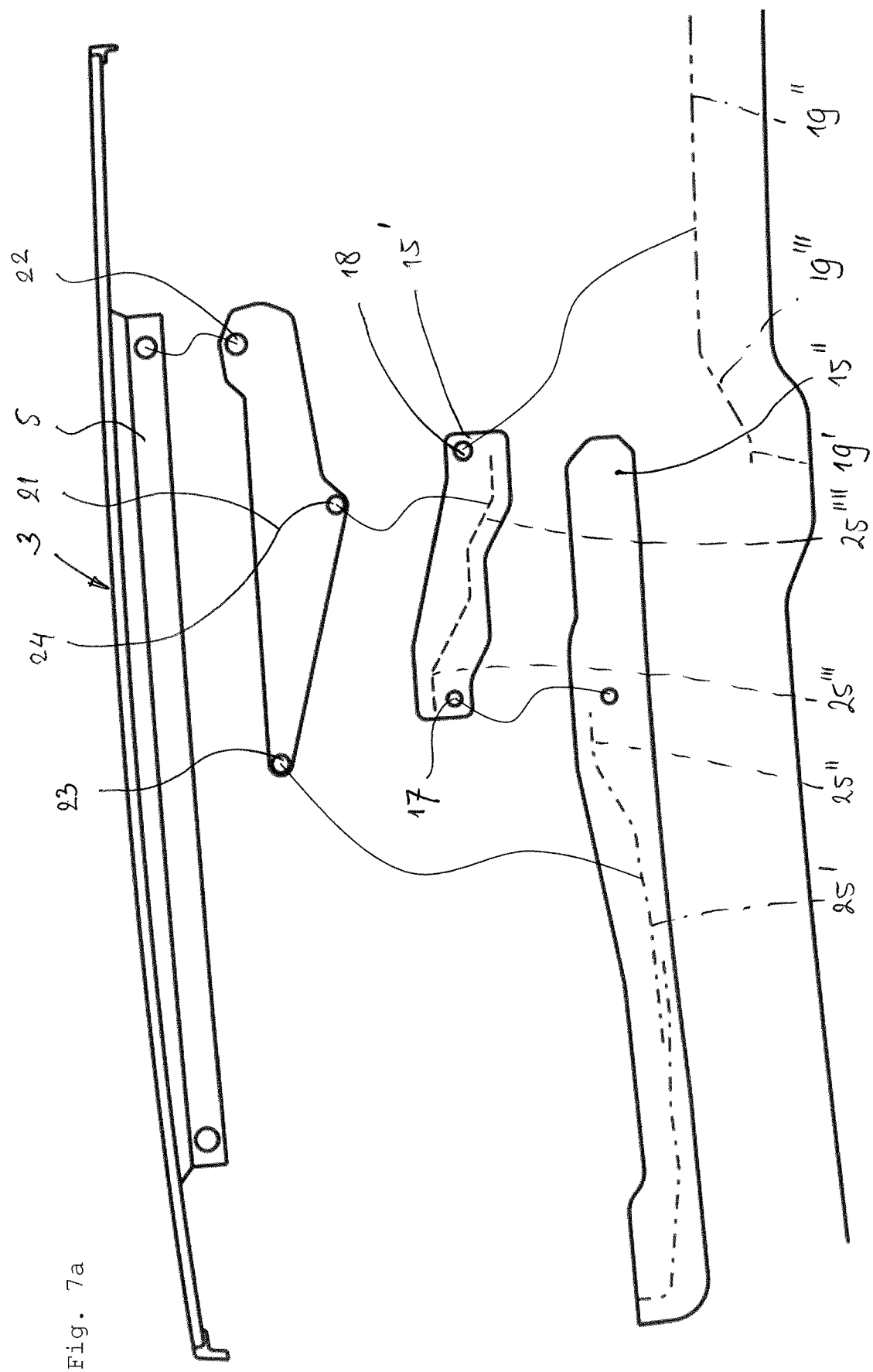

FIGS. 6a-6d show a fifth embodiment of the operating mechanism. In this embodiment, only lever 21 of rear device 8 is shown as it is lever 21 that is in engagement with pivotable first driving slide part 15'. As is shown, first driving slide part 15' is now provided with front portions 25' and 25" of rear guide curve 25 engaged by second pivot pin 23 of lever 21. First driving slide part 15' pivots with respect to second driving slide part 15" by means of pivot 17 at the front end of first driving slide part 15' and in a central section of second driving slide part 15". Guide curve 19 in stationary guide rail 6 has a short high front portion 19', a rearwardly and downwardly inclining portion 19"", and a low rear portion 19'". Again a high position of second pivot pin 23 of lever 21 when panel 3 is closed (FIG. 6b) enables a favourable lever ratio as this pivot pin 23 is moved downwardly when lever 21 rotates (FIG. 6c). Also, the downward pivoting movement of the rear end of first driving slide part 15' allows it to be positioned within the height of stationary guide rail 6 so that operating mechanism can be moved below stationary roof part 2 or rear panel 3' in rearward positions of panel 3 (FIG. 6d).

FIGS. 7a-7d show a sixth embodiment of the operating mechanism. In this embodiment, which is a variation on the embodiment of FIG. 6, pivot 17 has been moved to a rear section of second driving slide part 15" so that rear portions 25''' and 25'''' of rear guide curve 25 are provided in first driving slide part 15'. Now, guide cam 24 is in engagement with first driving slide part 15', which is again pivoting by means of pivot 17 that is arranged at the front end of first driving slide part 15'. Guide curve 19 in stationary guide rail 6 now has a low front portion 19', a rearwardly and upwardly inclined portion 19''' and a high rear portion 19". In the closed position of panel 3 and thus the front position of driving slide 15 (FIG. 7b), rear end of first driving slide part 15' is in a downward position projecting locally below stationary guide rail 6 and is positioned within the height of stationary guide rail 6 in rearward positions of driving slide 15.

FIGS. 8a-8d shows a seventh embodiment of the operating mechanism. In this embodiment, front lever 9 has been extended rearwardly so that its second pivot pin 11 can engage in rear portions 16''' and 16'''' of guide curve 16, which are now provided in second driving slide part 15". Moreover, second guide cam 13 is now positioned in line with second pivot pin 11 and engages stationary guide curve 14. Stationary guide curve 14 again has a front vertical locking portion 14', but rear portion 14" now connects to the lower end of vertical locking portion 14'. Locking of front lever 9 with respect to driving slide 15 in rearward positions thereof takes place by means of front portion 16''' of guide curve 16, which extends substantially vertically downwardly. The front portion 19' of stationary guide curve 19 is relatively long, so that the front side of panel 3 is lifted only when panel 3 has almost reached its fully open position. Guide cam 18 of first driving slide part 15' is then moved from low front portion 19' to high rear portion 19".

From the foregoing it will be clear that an operating mechanism is provided for an roof system that enables a low building height, sufficient lifting height of the panel and/or a stable support of the panel. The invention is not limited to the embodiments described above and shown in the drawings, which can be varied in different manners within the scope of the appended claims. For example, features from different embodiments may be combined in different manners. It is also conceivable that both first and second driving slide parts are pivotable, e.g. to influence movements of the levers of both front and rear devices. The first and second driving slide parts may be movably connected to each other in another way, for example slidably and pivotally.

Although the present invention has been described with reference to preferred embodiments, workers skilled in the art will recognize that changes may be made in form and detail without departing from the spirit and scope of the invention.

What is claimed is:

1. A roof system for a vehicle having a roof opening in a roof part thereof, comprising:
   a closure panel which is movable between a closed position in which the closure panel closes the roof opening and an open position in which the closure panel opens the roof opening and in which the closure panel is positioned at least partially above an adjoining portion of the roof part, the closure panel being provided with an operating mechanism allowing the closure panel to pivot and slide;

a stationary guide rail at each longitudinal side of said roof opening, suitable for slidably guiding the operating mechanism that operates the closure panel in a longitudinal direction of the vehicle, said operating mechanism comprising:

a front device which is configured to support and move a front edge of the closure panel in a vertical direction a rear device which is configured to move a rear edge of the closure panel towards a raised position relative to the closed position and above the adjoining portion of the roof part; and a driving slide which is slidably accommodated in each guide rail and is drivable in order to move the closure panel both in vertical and in horizontal directions via the front device and rear device;

wherein the front device comprises a lever which is pivotally in engagement with the closure panel by a first pivot pin on one end, and is pivotally and slidably connected to one of the driving slide and the stationary guide rail through a second pivot pin near an opposite end, and is provided with a first guide cam, which is in engagement with a curve in the driving slide, wherein the driving slide is provided with a first driving slide part and a second driving slide part, which are movably connected to each other, wherein the first driving slide part is pivotally and slidably connected to said lever with the first guide cam, and is provided with a driving slide guide cam engaging a guide curve in the stationary guide rail in order to force the first driving slide part to pivot with respect to the second driving slide part during at least a part of the sliding movement of the driving slide.

2. The roof system according to claim 1, wherein the lever of the front device is provided with a second guide cam which is in engagement with the stationary guide curve.

3. A roof system for a vehicle having a roof opening in a roof part thereof, comprising:

a closure panel which is movable between a closed position in which the closure panel closes the roof opening and an open position in which the closure panel opens the roof opening and in which the closure panel is positioned at least partially above an adjoining portion of the roof part, the closure panel being provided with an operating mechanism allowing the closure panel to pivot and slide;

a stationary guide rail at each longitudinal side of said roof opening, suitable for slidably guiding an operating mechanism that operates the closure panel in a longitudinal direction of the vehicle, said operating mechanism comprising:

a front device which is configured to support and move a front edge of the closure panel in a vertical direction a rear device which is configured to move a rear edge of the closure panel towards a raised position relative to the closed position and above the adjoining portion of the roof part; and a driving slide which is slidably accommodated in each guide rail and is drivable in order to move the closure panel both in vertical and in horizontal directions via the front device and rear device;

wherein the front device comprises a lever which is pivotally in engagement with the closure panel by a first pivot pin on one end, and is pivotally and slidably connected to one of the driving slide and the stationary guide rail through a second pivot pin near an opposite end, the lever being provided with a first guide cam, which is in engagement with a curve in the driving slide and being provided with a second guide cam which is in engagement with the stationary guide curve, wherein the driving slide is provided with a first driving slide part and a second driving slide part, which are movably connected to each other, wherein one of the first and second driving slide parts, that is pivotally and slidably connected to said lever with the first guide cam, is provided with a driving slide guide cam engaging a guide curve in the stationary guide rail in order to force said one of the first and second driving slide parts to pivot with respect to the other driving slide part during at least a part of the sliding movement of the driving slide.

4. A roof system for a vehicle having a roof opening in a roof part thereof, comprising:

a closure panel which is movable between a closed position in which the closure panel closes the roof opening and an open position in which the closure panel opens the roof opening and in which the closure panel is positioned at least partially above an adjoining portion of the roof part, the closure panel being provided with an operating mechanism allowing the closure panel to pivot and slide;

a stationary guide rail at each longitudinal side of said roof opening, suitable for slidably guiding an operating mechanism that operates the closure panel in a longitudinal direction of the vehicle, said operating mechanism comprising:

a front device which is configured to support and move a front edge of the closure panel in a vertical direction a rear device which is configured to move a rear edge of the closure panel towards a raised position relative to the closed position and above the adjoining portion of the roof part; and a driving slide which is slidably accommodated in each guide rail and is drivable in order to move the closure panel both in vertical and in horizontal directions via the front device and rear device;

wherein the front device comprises a lever which is pivotally in engagement with the closure panel by a first pivot pin on one end, and is pivotally and slidably connected to a curve in the driving slide through a second pivot pin near an opposite end, wherein the driving slide is provided with a first driving slide part and a second driving slide part, which are movably connected to each other, wherein one of the first and second driving slide parts, that is pivotally and slidably connected to said lever, is provided with a driving slide guide cam engaging a guide curve in the stationary guide rail in order to force said one of the first and second driving slide parts to pivot with respect to the other driving slide part during a part of the sliding movement of the driving slide, wherein the lever is provided with a first guide cam which engages a curve portion of a curve in the first driving slide part.

5. The roof system according to claim 4, wherein the second pivot pin of the lever of the front device engages a curve portion of the curve in the first driving slide part.

6. The roof system according to claim 4, wherein the second pivot pin of the lever of the front device engages a curve portion of a curve in the second driving slide part.

7. The roof system according to claim 3, wherein the first guide cam of the lever of the front device engages a curve portion of the curve in the second driving slide part.

8. The roof system according to claim 1, wherein the first driving slide part is pivotally connected to the second driving slide part near a rear end of the first driving slide part.

9. The roof system according to claim 8, wherein the driving slide guide cam of the first driving slide part is arranged at a distance from a pivot between the first and second driving slide parts.

10. The roof system according to claim 9, wherein the guide curve in the stationary guide rail is shaped such that a portion of the first driving slide part spaced from the pivot extends above or below the stationary guide rail in the closed position of the closure panel and is moved by the guide cam sliding through the guide curve to a position in which the first driving slide part is positioned substantially within boundaries of the stationary guide rail.

11. The roof system according to claim 2, wherein the guide curve in the first driving slide part extends rearwardly and downwardly.

12. The roof system according to claim 1 wherein the first driving slide part and the second driving slide part are pivotally connected to each other.

13. The roof system according to claim 3, wherein the first driving slide part is pivotally connected to the second driving slide part near a rear end of the first driving slide part.

14. The roof system according to claim 13, wherein the driving slide guide cam of the first driving slide part is arranged at a distance from a pivot between the first and second driving slide parts.

15. The roof system according to claim 4, wherein the first driving slide part is pivotally connected to the second driving slide part near a rear end of the first driving slide part.

16. The roof system according to claim 15, wherein the driving slide guide cam of the first driving slide part is arranged at a distance from a pivot between the first and second driving slide parts.

17. The roof system according to claim 1, wherein the first driving slide part is pivotally connected to the second driving slide part near a front end of the second driving slide part.

18. The roof system according to claim 17, wherein the driving slide guide cam of the first driving slide part is arranged at a distance from a pivot between the first and second driving slide parts.

19. The roof system according to claim 18, wherein the guide curve in the stationary guide rail is shaped such that a portion of the first driving slide part spaced from the pivot extends above or below the stationary guide rail in the closed position of the closure panel and is moved by the driving slide guide cam sliding through the guide curve to a position in which the first driving slide part is positioned substantially within boundaries of the stationary guide rail.

\* \* \* \* \*